United States Patent
Meshulam et al.

(10) Patent No.: US 12,141,273 B2
(45) Date of Patent: Nov. 12, 2024

(54) FOCUSED IMAGE GRABBING

(71) Applicant: Proofpoint, Inc., Sunnyvale, CA (US)

(72) Inventors: Yigal Meshulam, Modiin (IL); Tamir Pivnik, Nahariya (IL); David Cohen, Rishon LeTsiyon (IL); Alexander Kremer, Lexington, MA (US); Mayank Choudhary, Shrewsbury, MA (US); Tal Tikotzki, Ramat Gan (IL); Mike McKee, Newton, MA (US); Nir Barak, Karmei Yosef (IL); Tal Yaffe, Beer Yaakov (IL)

(73) Assignee: Proofpoint, Inc., Sunnyvale, CA (US)

( * ) Notice: Subject to any disclaimer, the term of this patent is extended or adjusted under 35 U.S.C. 154(b) by 214 days.

(21) Appl. No.: 17/760,804

(22) PCT Filed: Sep. 22, 2020

(86) PCT No.: PCT/US2020/051908
§ 371 (c)(1),
(2) Date: Mar. 16, 2022

(87) PCT Pub. No.: WO2021/055986
PCT Pub. Date: Mar. 25, 2021

(65) Prior Publication Data
US 2022/0342986 A1 Oct. 27, 2022

Related U.S. Application Data

(60) Provisional application No. 62/903,892, filed on Sep. 22, 2019.

(51) Int. Cl.
*G06F 21/55* (2013.01)

(52) U.S. Cl.
CPC .......... *G06F 21/552* (2013.01); *G06F 21/554* (2013.01); *G06F 2221/03* (2013.01)

(58) Field of Classification Search
CPC ...... G06F 21/55; G06F 21/552; G06F 21/554; G06F 2221/03
See application file for complete search history.

(56) References Cited

U.S. PATENT DOCUMENTS

| | | | |
|---|---|---|---|
| 9,167,047 B1* | 10/2015 | Sharma | H04L 67/535 |
| 9,361,469 B2* | 6/2016 | Thiyagarajan | G06F 3/1454 |
| 9,535,651 B2* | 1/2017 | Khalatian | G06F 3/1462 |
| 9,699,271 B2* | 7/2017 | Brander | G06F 21/6245 |
| 9,762,651 B1* | 9/2017 | Sharifi | G06F 40/169 |

(Continued)

OTHER PUBLICATIONS

International Search Report for PCT/US20/51908 mailed Dec. 30, 2020.

*Primary Examiner* — Linglan Edwards
(74) *Attorney, Agent, or Firm* — Sheehan Phinney Bass & Green PA

(57) ABSTRACT

A computer-based method includes monitoring user activities at an endpoint device on a computer network, determining if one of the user activities at the endpoint device presents a potential threat to network security, creating an alert of the potential threat, and providing, with the alert, a redacted version of a screenshot from the endpoint device. One or more open windows that appeared on the screen of the endpoint device are obscured or removed in the redacted version of the screenshot of the endpoint device.

18 Claims, 7 Drawing Sheets

(56) References Cited

U.S. PATENT DOCUMENTS

| | | | |
|---|---|---|---|
| 10,347,293 B1* | 7/2019 | Skinner | G06F 3/1462 |
| 10,482,284 B1* | 11/2019 | Tang | G06F 21/6254 |
| 10,592,572 B2* | 3/2020 | Salim | G06F 40/134 |
| 2005/0086255 A1* | 4/2005 | Schran | G06F 11/3476 |
| | | | 714/E11.193 |
| 2007/0234212 A1* | 10/2007 | de Souza | G06F 3/0481 |
| | | | 715/803 |
| 2010/0055656 A1* | 3/2010 | Lemmers | G16H 40/67 |
| | | | 434/262 |
| 2014/0215356 A1* | 7/2014 | Brander | G06F 21/84 |
| | | | 715/753 |
| 2020/0193019 A1 | 6/2020 | Tietz et al. | |

* cited by examiner

FOCUSED IMAGE GRABBING

CROSS-REFERENCE TO RELATED APPLICATION(S)

This application is a national stage entry of PCT Application No. PCT/US20/51908, entitled Focused Image Grabbing, which was filed on Sep. 22, 2020 and claims the benefit of priority to U.S. Provisional Patent Application No. 62/903,892, entitled Focused Image Grabbing, which was filed on Sep. 22, 2019. The disclosures of the prior applications are incorporated by reference herein in their entirety.

FIELD OF THE INVENTION

This disclosure relates to the field of screen or image grabbing and, more particularly, relates to focused image grabbing in the context of a network security system.

BACKGROUND

Insider Threat Management (ITM) systems, such as the ObserveIT® ITM system, available from Proofpoint, Inc., automatically collect large amounts of information relating to users' activities at endpoint devices in a company's computer network. Such ITM systems generally process the collected information to identify possible insider threats, such as company employees trying to exfiltrate confidential company data from its computer network(s). Any identified threats may be flagged to a system administrator, for example.

SUMMARY OF THE INVENTION

In one aspect, a computer-based method includes monitoring user activities at an endpoint device on a computer network, determining if one of the user activities at the endpoint device presents a potential threat to network security, creating an alert of the potential threat, and providing, with the alert, a redacted version of a screenshot from the endpoint device. One or more open windows that appeared on the screen of the endpoint device are obscured or removed in the redacted version of the screenshot of the endpoint device.

In a typical implementation, the method includes storing other screenshots for other activities (e.g., before and/or after the alert activity) that, if made available for display with the alert, would provide context to the user activity associated with the alert. Moreover, in a typical implementation, those other screenshots are redacted so as to not contain certain types of information (e.g., private data or data that otherwise should not be collected, such as data from a system to collect user complains).

In another aspect, a computer system includes a plurality of endpoint devices coupled to a communications network. Each endpoint device has a computer-based processor and computer-based memory. The computer-based memory stores computer-readable instructions that, when executed by the processor, cause the processor to act as a computer-based endpoint agent for the associated endpoint device. Each computer-based endpoint agent is configured to monitor user activities at the associated endpoint device. The computer system (e.g., with the endpoint agent) is configured to identify if any of the monitored user activities presents a potential threat to network security, create an alert of any such potential threats, and provide, with the alert, a redacted version of a screenshot from an associated one of the endpoint devices, wherein one or more open windows on a screen of the associated endpoint device are obscured or removed in the redacted version.

In some implementations, one or more of the following advantages are present.

In the security world, data about a wide range of user activities may be captured and analyzed, however a balance between security and data privacy should be kept. In a typical implementation, using the systems and techniques disclosed herein, personal information that is irrelevant to the organization and does not present a threat can be omitted and ignored, automatically (e.g., without ongoing involvement from a human).

Moreover, in a typical implementation, the systems and techniques disclosed herein help reducing private data capturing while providing as full of a contextual understanding around a user activity as practical by removing applications and browsers containing private data and capturing only such applications that are of interest. Capturing only these application of interest (AOIs) can play a major part in governing data privacy by complying to GDPR, PCI and HIPAA where sensitive data such as medical records are excluded.

Additionally, in some implementations, the systems and techniques disclosed herein help to reduce CPU load at the endpoint machine (e.g., by reducing the total image bytes that need to be capture and processed), network bandwidth requirements (e.g., due to reducing binary data size, the overall package that travels between the agent and the backend may be lowered), and/or storage requirements (e.g., the overall total size may be decreased, in a high volume environment).

Other features and advantages will be apparent from the description and drawings, and from the claims.

BRIEF DESCRIPTION OF THE DRAWINGS

FIG. 6B is an example of what a redacted version of the FIG. 6A screenshot might look like.

Like reference characters refer to like elements.

DETAILED DESCRIPTION

Insider Threat Management (ITM) systems, such as the ObserveIT® ITM system, available from Proofpoint, Inc., automatically collect various types of data and/or metadata relating to users' activities at the endpoint devices on a company's computer network. The collected information may be analyzed to determine whether any of the associated users' activities might amount to a possible insider threat, such as an attempt at exfiltrating confidential company data from its computer networks. If any such threats are identified, the system flags those threats to a system administrator, for example, who can then take appropriate corrective measures if needed.

Data protection and data privacy are of paramount importance in today's connected society and are becoming more and more important almost every day. This is evidenced in part by the recent enactment of several legal regimes aimed at helping to ensure adequate data protection and data privacy. Examples include the European Union's General Data Protection Regulation ("GDPR") and the California Consumer Privacy Act ("CCPA"). Additionally, companies, their customers/clients, and the public have, all over time, become more aware of and sensitive to these sorts of issues and concerns.

Figure 1:
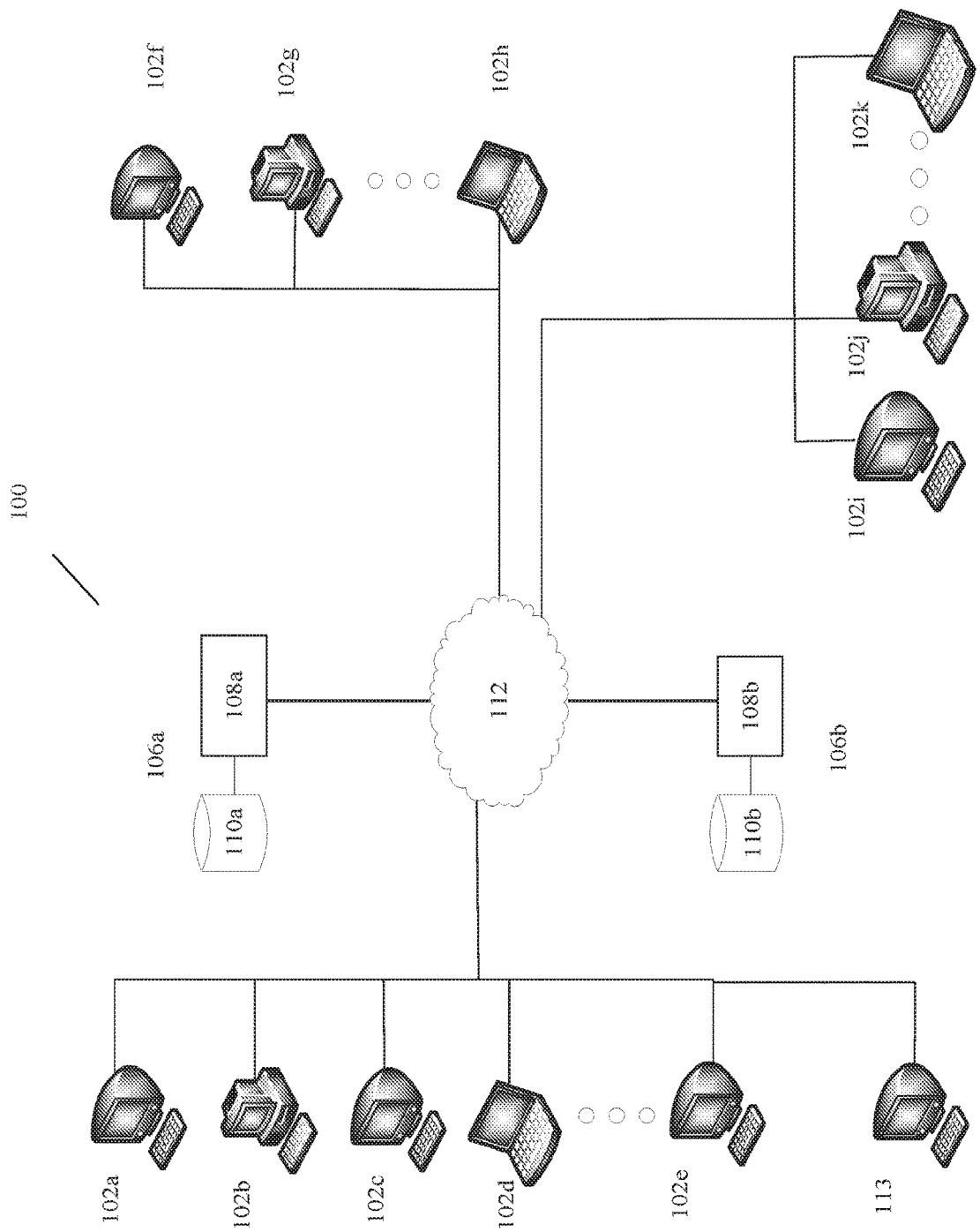
FIG. 1 is a schematic representation of an implementation of a computer network.

FIG. 1 is a schematic representation of a computer network 100 that has a plurality of endpoints or nodes, each of which has, connected to it, one or more associated endpoint devices 102a-102k and an endpoint device 113, with associated memory for a system administrator. The computer network 100 has a plurality of remote processing systems 106a, 106b, each of which has a computer server 108a, 108b with one or more internal computer processors and computer memory 110a, 110b. The endpoint devices 102a-102k, 113 and remote processing systems 106a, 106b are connected, and able to communicate with the other connected network components, via a communications network 112.

The computer network 100 has an insider threat management (ITM) system that monitors user activities at the various endpoint devices 102a-102k, analyzes those activities, and alerts a system administrator of any potential insider threats it identifies based on the analyzed user activities. In a typical implementation, anytime the ITM system provides the administrator with such an alert, the ITM system also provides the administrator with access to screengrab data that shows the screen of the endpoint device where the suspicious user activity happened and when or near when the suspicious user activity happened. Typically, this sort of screengrab data can enhance the administrator's understanding of the user's activity that triggered the alert so that an appropriate response can be efficiently and effectively conceived and deployed.

In some instances, the screengrab data presented to the administrator will shows the user's entire screen when the triggering user activity occurred. This screengrab data gives the administrator insight into what the user was able to see on his or her screen when the triggering user activity occurred. Sometimes, however, users have windows open on their screens that might include persons or private information, such as a browser window showing a bank website with personal bank account information shown in the browser window. In those instances, showing screengrab data with the user's entire screen to the administrator would give rise to potentially significant privacy issues and implications.

In order to avoid these sorts of issues and implications, the screengrab data that the ITM system provides to the administrator is redacted so as to remove or cover up the details of any open window that might include personal or private information of the user not likely relevant to the threat suggested by the triggering user activity.

Figure 6A:
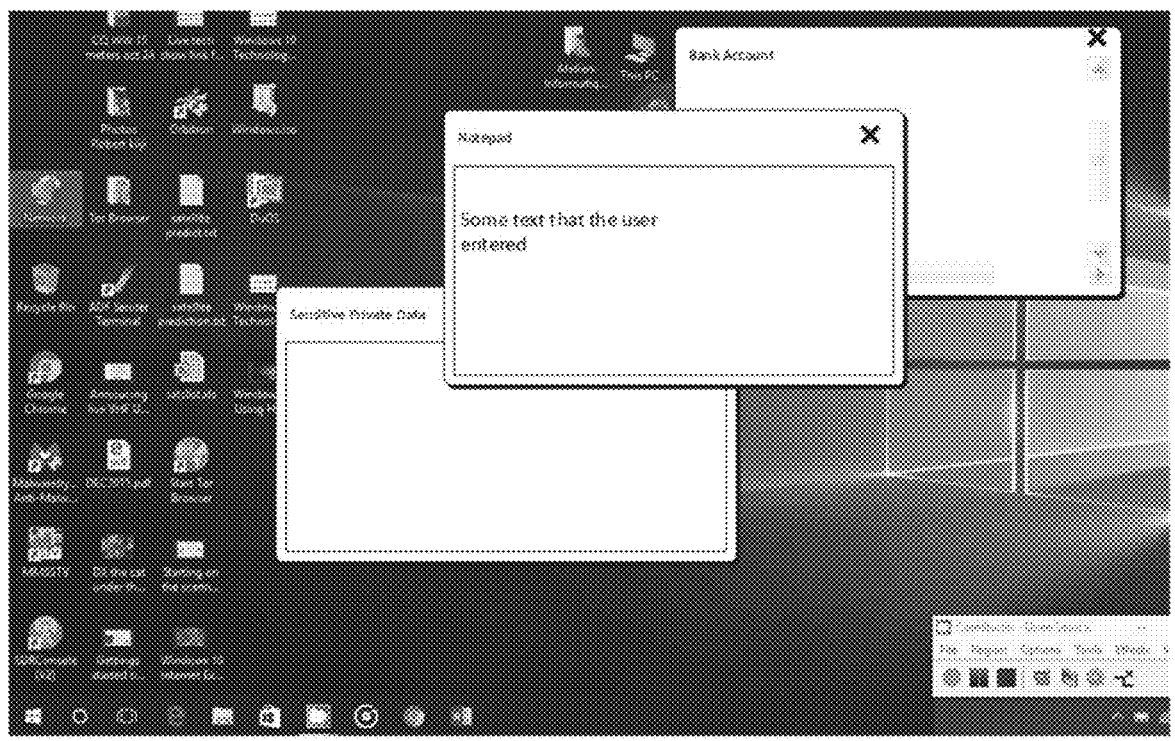
FIG. 6A is a partial example of a screenshot from a screengrab captured from a user's endpoint device.

FIG. 6A represents a partial exemplary screenshot 421 from a screengrab captured from a user's endpoint device. The illustrated screenshot has four open windows: a first open window, entitled Notepad, with some text that the user entered; a second window, entitled Bank Account; a third window, entitled Sensitive Private Data, and a fourth window, with the Cam Studio application, an open-source screen casting program for the Microsoft Windows® operating system. Although the Bank Account window and Sensitive Private Data window are shown as being empty, each of these windows could, of course, include data, some of which may be private or sensitive. The illustrated partial screenshot 421 is an example of what the system 200 may capture in a screengrab from the user's endpoint device when a triggering user activity occurs at the user's endpoint device.

In a typical implementation, the system 200 might redact certain windows from screenshot 421 before making the screenshot available to the system administrator in connection with an insider threat alert. For example, the system 200 might redact the second window, entitled Bank Account and the third window, entitled Sensitive Private Data, over concerns about privacy. The second window, entitled Bank Account, might be redacted over concerns that it might include personal bank account information (e.g., account numbers, account balances, etc.), as suggested by the title of the second window itself. The third window, entitled Sensitive Private Data, might be redacted over concerns that it might include sensitive private data, as suggested by its title.

In a typical implementation, the system 200 would leave the first window, entitled Notepad, with some text that the user entered, and the fourth window, with the Cam Studio application, intact and not redacted. This is because nothing about these windows (e.g., not their titles, content, or application or process name of the application that the windows belong to, or site name/full URL is the application is an Internet browser) seems to suggest that sensitive, private, or confidential data might be contained therein.

There are a variety of ways in which the system 200 might produce a version of the screenshot 413 redacted to remove or cover up the second window, entitled Bank Account, and the third window, entitled Sensitive Private Data. In some implementations, the resulting redacted version of screenshot 413 might show everything in the screenshot 413 but with the second window, entitled Bank Account, and the third window, entitled Sensitive Private Data, simply removed. In some implementations, the resulting redacted version of screenshot 413 might show everything in the screenshot 413 but with the second window, entitled Bank Account, and the third window, entitled Sensitive Private Data, covered (e.g., darkened over or covered with an empty "window" with the same dimensions and location on the screen). Another option would be to show only the window in focus if any of the background applications are determined to be ones that should be excluded, but to show the full screen if none of the excluded applications currently appear on screen.

Figure 6B:
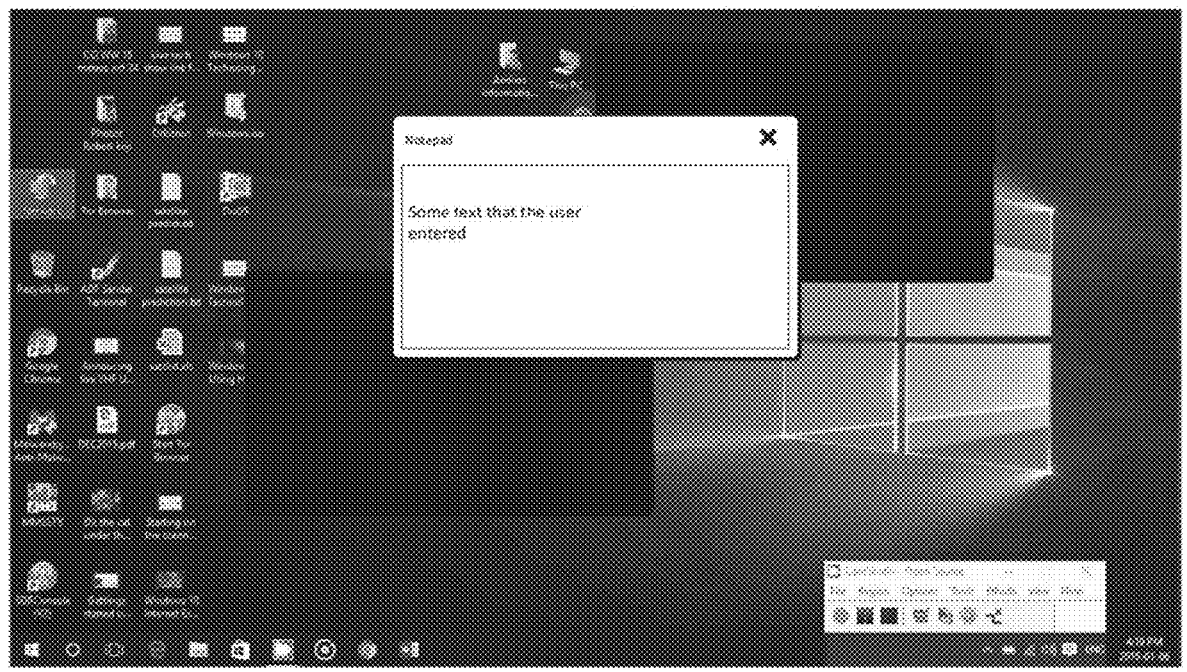

FIG. 6B shows an example of what the redacted version 415 of the FIG. 6A screenshot 415 might look like if the system utilized the latter approach and darkened over the windows with metadata indicators (e.g., window titles) suggesting that they might contain private, sensitive or confidential user information. In illustrated redacted screenshot 415, the second window, entitled Bank Account, and the third window, entitled Sensitive Private Data, are not visible. Instead, dark-colored rectangles appear where those windows (i.e., the second window, entitled Bank Account, and the third window, entitled Sensitive Private Data) appeared in screenshot 413. The redacted version 415 of the screenshot shows all the other windows (i.e., the Notepad window and the CamStudio window) and every other part of the screen as it appeared in screenshot 413 prior to redacting.

In some implementations, although the screenshot 413 shown in FIG. 6A is what the user would have seen looking at his or her endpoint device screen when the triggering user activity occurred, the screenshot 415 in FIG. 6B is what the administrator would be permitted to view in connection with an alert over the user's triggering user activity.

Thus, in a typical implementation, it can be appreciated that the ITM system 200, implementing the systems and techniques disclosed herein, strikes a balance between giving the system administrator visual insight into what a user could have been looking at on the screen of his or her user endpoint device when the triggering user activity occurred, and protecting the privacy rights and confidentiality of that user.

Figure 2:
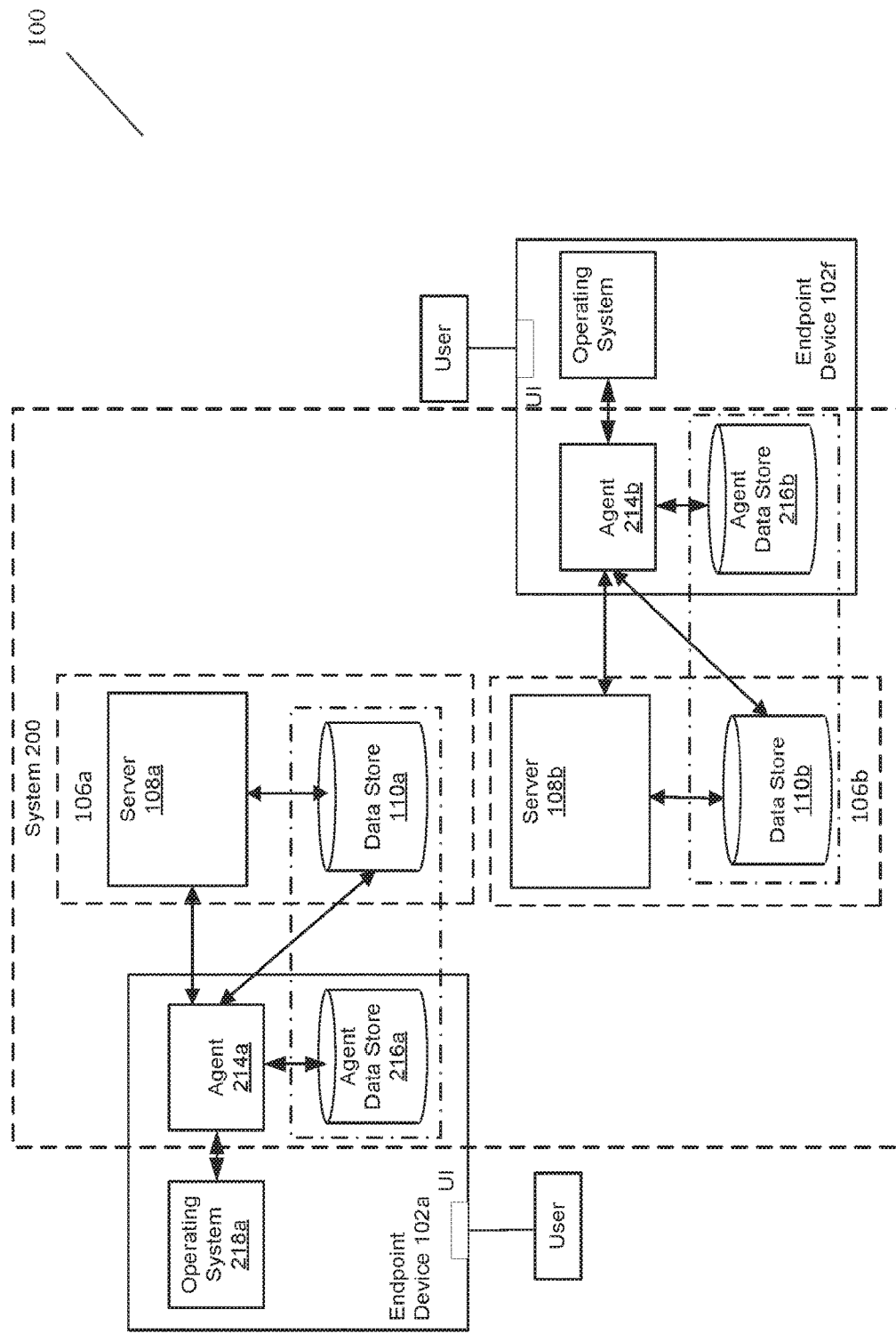
FIG. 2 is a schematic representation of a network security system deployed on the computer network of FIG. 1.

FIG. 2 is a schematic representation of a network security system 200, with ITM functionalities, deployed on computer network 100.

The illustrated security system 200 has a computer-based agent 214a-214k, with an associated computer-based data store 216a-216k, deployed in each respective one of the endpoint devices 102a-102k. The agents 214a-214k interact with their associated endpoint devices to collect telemetry data about user activities on those endpoint devices. The telemetry data for a particular endpoint device 102a-102k may be collected from the device's operating system 218a-218k or as user session information. In this regard, as illustrated, each endpoint device is hooked into and interacts with the operating systems 218a-218k of its endpoint device. Each endpoint device 102a, 102f has a user interface UI that enables the user to interact with the endpoint device 102a, 102k that enables a user to interact with the computer network 100 and system 200. In a typical implementation, the user interface includes at least a visual interface, such as a computer monitor, touch screen, etc., from which a screengrab can be captured. The data processing facilities 106a, 106b also form part of the illustrated security system 200.

Each data processing facility 106a, 106b has processing and storage capabilities that are provided by the servers 108a, 108b and computer-based data stores 110a, 110b in each facility. In a typical implementation, each data processing facility provides processing and/or storage functionalities to support system functionalities, as disclosed herein. Moreover, in some implementations, a remote processing facility stores data identifying various window parameters (e.g., window titles, applications, process names, URLs, (optionally) content, combinations thereof, etc.) that, if present for a particular window, means that that window should be excluded from any screenshots shown to the network administrator, for example. In a typical implementation, the system 200 enables the network administrator to provide input on the list of window parameters that warrant such exclusion. Moreover, in a typical implementation, the server (e.g., 108a) in one of the data processing facilities (e.g., 106a) periodically sends to each of its associated endpoint agents (e.g., 214a-214e) the list of excludable window parameters (e.g., apps, URLs, window titles, etc.). Then, as user activities occur at the various endpoint devices (e.g., 102a-102e), the endpoint agents 214a-214e at those endpoint devices compare this list to corresponding data that is collected by the endpoint agents 214a-214e about the user activities that happen at their respective endpoint devices 102a-102e. From that, the endpoint agent 214a-214e identifies which window(s) from a screenshot (or screenshots) should be redacted before providing a redacted version of the screenshot (or screenshots) to accompany an alert, obtains or otherwise creates the redacted screenshot(s) with the identified window(s) (e.g., by interacting with the operating system), sends the redacted screenshot(s) off to the server, for example, to accompany an alert, if needed.

Figure 3:
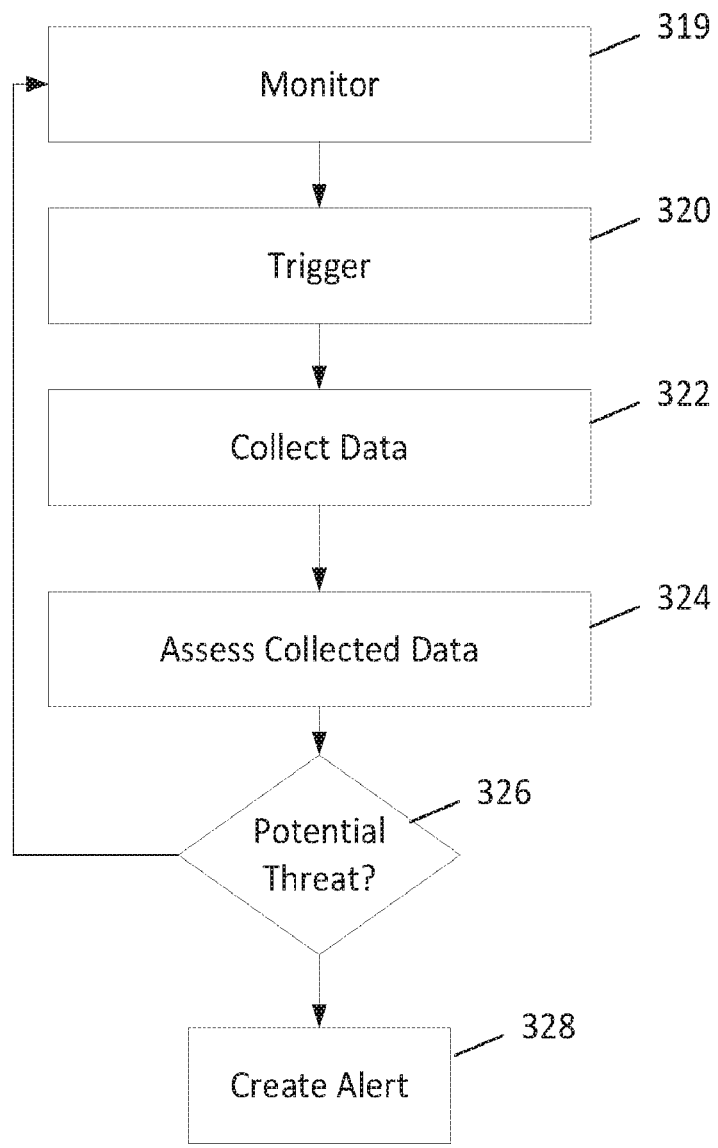
FIG. 3 is a flowchart of an exemplary process that may be performed by security system of FIG. 2 to monitor users' activities on network endpoint devices and produce alerts of possible threats identified based on the monitored user activities.

FIG. 3 is a flowchart of an exemplary process that can be performed by ITM system 200, for example, to monitor users' activities on the endpoint devices 102a-102k of system 100 and alert a system administrator (e.g., at 113) of any possible threats identified based on the monitored user activities, where the alert can include access to screengrab data that might be partially redacted if appropriate to minimize the possibility of exposing any of the user's private, sensitive or confidential information.

According to the flowchart, the ITM system 200 (at 319) monitors the endpoint devices 102a-102k for evidence of any user activities (e.g., mouse clicks, keyboard clicks, etc.). During this time, the ITM system 200 may be sitting idly, awaiting evidence of a user activity.

According to the illustrated flowchart, a trigger occurs (at 320) to urge the system out of idle mode. The trigger can be caused by virtually any user kind of user activity (e.g., a mouse click, a keyboard click, an indication that a new application has been opened, a switch between two open applications, etc.) at one of the endpoint devices 102a-102k on the network 100. If, for example, a user has clicked a mouse at user endpoint device 102a, then operating system 218a at the user endpoint device 102a where the trigger occurred may provide an indication of this user activity to the endpoint agent 214a.

In response to receiving this user activity indicator from the operating system 218a, the endpoint agent 214a begins (at 322) to collect telemetry data related to the triggering user activity. In some implementations, the telemetry data that the endpoint agent 102a collects in this regard can include metadata identifying any open windows, the title of each open window, the application being used in each open window, screen position information about each window, which of the open widows is in focus, other textual information about certain windows (e.g., email subject lines, etc.), etc.

In a typical implementation, the endpoint agent 102a transmits the collected telemetry data to a selected one of the remote data processing facilities (e.g., 106a in FIG. 1). The data processing facility 106a analyzes or assesses the collected telemetry data (at 324) to identify any potential threat, based on the collected telemetry data. There are a variety of ways in which this kind of assessment may be made. One such example is disclosed in US Patent Application Publication No. 2020/0193019, entitled Managing Data Exfiltration Risk, which is incorporated by reference herein in its entirety and in particular with respect to its description of techniques and systems for analyzing and determining whether data related to a particular user activity might indicate an insider threat, such as an exfiltration risk. As another example, this kind of assessment can be made in much the same manner that the ObserveIT ITM solution, available from Proofpoint. Inc. makes similar sorts of assessments. In fact, the systems and techniques disclosed herein can be incorporated into and utilized as part of the ObserveIT ITM solution. In those instances, the threat risk assessment conducted at the data processing facility 106a (at 324 in FIG. 3) might be identical to what the ObserveIT ITM system already does. In some implementations, the assessment may be made with reference to other telemetry data that was collected in response to one or more earlier triggering user activities.

If the data processing facility 106a fails to identify any potential insider threat based on its assessment (at 324), then (at 326) the process is essentially concluded at least with respect to that particular triggering user activity and the system 200 cycles back to 319 to monitor for a further user activity at endpoint device 102*a*. If, however, the data processing facility 106*a* identifies a potential insider threat based on its assessment (at 324), then (at 326) the process continues and the system 200 creates an alert (at 328) that includes or provides access to a screenshot or redacted screenshot from the screen of the endpoint device 102*a* at which the triggering user activity happened.

There are many forms that the alert can take when it is created (at 328).

For example, the alert can take the form of any one or more of a plurality of possible electronic communications including, for example, an email, a short message service (SMS) text message, a message transmitted within an messaging app, or any other form of electronic communication. The alert can include a short message with a hyperlink to more information, a short message with an attachment (e.g., pdf or WORD document) with more information, a longer message with all the relevant information included and/or embedded directly in the message, or any other variation of message, link, attachment, and/or other that can be used to convey information to the system administrator. In some implementations, the alert may be made available for viewing in a web console for system 200. In some implementations, the alert may include screenshots for one or more user activities before and/or after the user activity as well.

As an example, a short message with a hyperlink might read something like this: "Click here for information about a potential insider threat: <link to more information>," where the <link to more information> is a hyperlink to a webpage, for example, hosted by and populated by system 200 with some or all of the telemetry data related to the user activity that triggered the alert, and (optionally) an image of the screenshot (redacted, if appropriate) from the endpoint device 102*a* when, or approximately when, the triggering user activity occurred.

Figure 4:
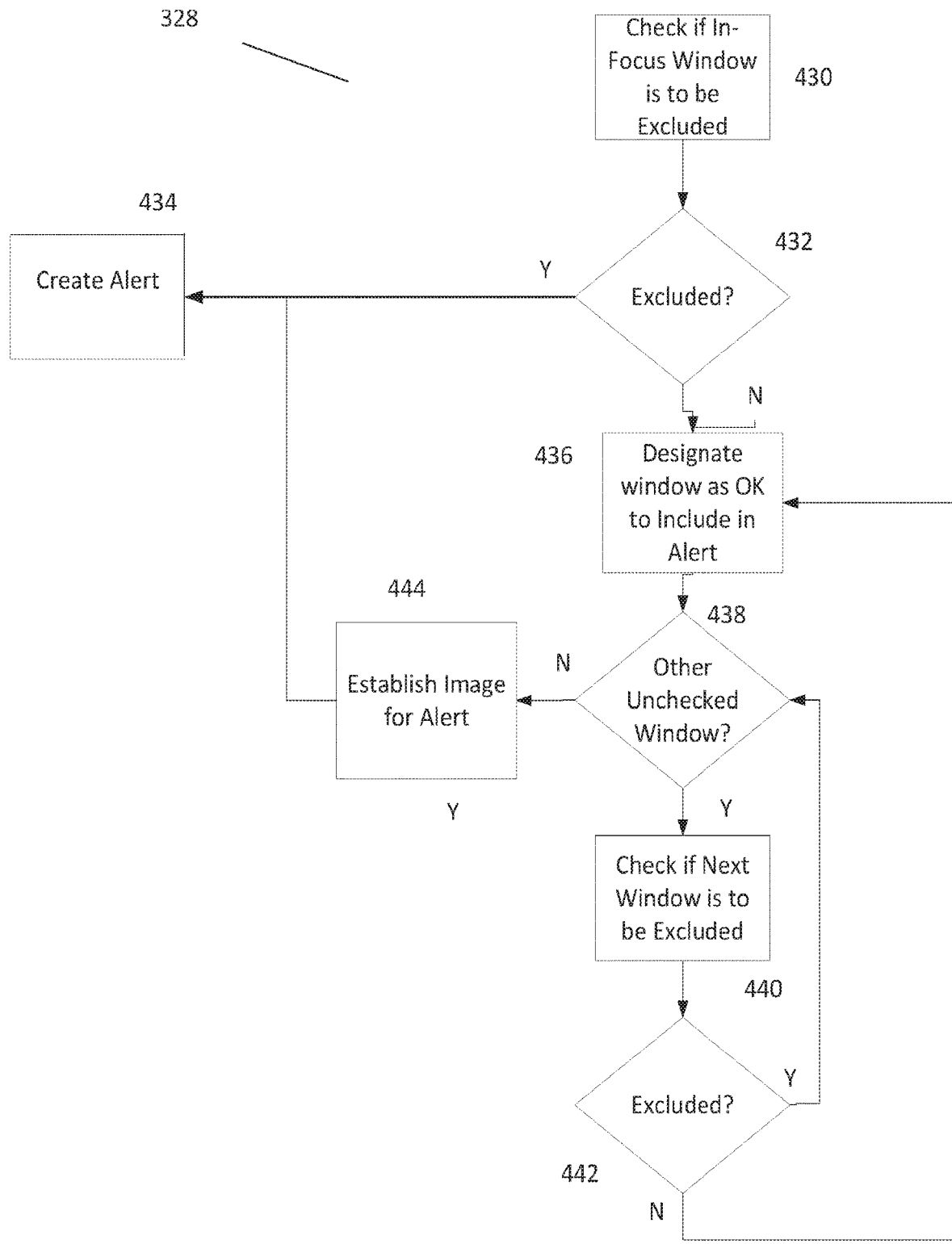
FIG. 4 is a flowchart of an exemplary process that the security system in FIG. 2 may perform to create an alert.

FIG. 4 is a flowchart of an exemplary process that system 200 may perform to create the alert (at 328). The process includes classifying each open window according to whether that window should be excluded or may be included in any screenshots that might be presented to the administrator in an alert, and then creating the alert accordingly. In various implementation, some of or all the process represented in the illustrated flowchart is performed by an endpoint agent in a corresponding one of the endpoint devices.

The process, according to the illustrated flowchart, begins (at 430) by checking if the window that was in-focus (or active) when the triggering user activity occurred should be excluded from the administrator alert.

There are a variety of ways in which this checking step (at 430) can be performed.

For example, in some implementations, the system 200 stores in its computer-based memory (e.g., 110*a* and/or 216*a*) a list of window parameters or characteristics ("excludable parameters") that would warrant excluding a window from an administrator alert. In some implementations, the system 200 may be initially set up with a default list of excludable parameters. In a typical implementation, however, the system 200 enables the system administrator, for example, to edit the list either by adding, deleting, or modifying excludable parameters from the list.

In this sort of implementation, the system 200 (e.g., agent 214*a*) compares the window parameters for the in-focus window against the list of excludable parameters. In a typical implementation, the window parameters of the in-focus window would have been part of the telemetry data received from the endpoint agent 214*a* and would have been stored, for example, in data store 110*a*.

If the system 200 (e.g., endpoint agent 214*a*) identifies any matches between the parameters of the in-focus window and the excluded parameters, then the system 200 concludes (at 432) that the in-focus window should be excluded from any administrator alert. If the system 200 concludes (at 432) that the in-focus window should be excluded from any administrator alert, it does not, according to the illustrated flowchart, check if any of the other open windows should be excluded. Instead, the system 200 proceeds to 434 and creates the alert. If the alert is created at this point, it is done so without including any image data, i.e., without including any screenshots showing the screen of the user's endpoint device.

As an example, if the in-focus window represented by the telemetry data received from the endpoint agent 214*a* is a web browser with the Facebook® social media website ("Facebook.com") open in it, and the list of excluded parameters identifies the Facebook® social media site, "Facebook.com," as appearing in the URL of the browser that is in focus, as something to be excluded, then the system 200 would conclude (at 432) that the in-focus web browser with the Facebook® social media website should be excluded. In that instance, according to the illustrated flowchart, the system 200 (at 434) would create the alert without any image data (i.e., screenshot).

If the system 200 (at 430) does not identify any matches between the parameters of the in-focus window and the excluded parameters, then the system 200 concludes (at 432) that the in-focus window need not be excluded from any administrator alert. If the system 200 (at 432) determines that the in-focus window need not be excluded (i.e., that the in-focus window may be included in an administrator alert), then the system 200 (at 436) so designates that window.

There are a variety of ways in which the system 200 might designate the window as being ok to include in the administrator alert. In one example, the system 200 creates a list of windows from the screen of the user endpoint device that have been checked and determined to be ok to include in the administrator alert. In that example, the system 200 (at 436) would designates the checked window as being ok to include in the administrator's alert by adding the window to the list.

Next, according to the illustrated flowchart, the system 200 (at 438) checks whether there are any other windows that need to be checked for possible inclusion in the administrator alert. In a typical implementation, the system 200 can make this determination by keeping track of which windows have been checked already and determining whether the telemetry data received from the endpoint agent 214*a* indicates that any other windows (not yet checked) were on the screen of the user's endpoint device 102*a*.

If the system 200 determines (at 438) that there are other windows that should still be checked, then the system 200 (at 440) checks one of the other windows. The system 200 can check the other windows in any order (e.g., randomly, according to their relative positions on screen, according to their stacking order (z-order), alphabetically by window title or application, etc.). Checking the next window (at 440) can be done in much the same manner as the initial (in-focus) window was checked (at 430).

If the system 200 concludes (at 442) that the next window should be excluded from any administrator alert, the system 200 proceeds to 438 and checks whether there are any other windows that need to be checked for possible inclusion in the administrator alert. If the system 200 concludes (at 442) that the window should not be excluded, then the system (at 436) so designates that window. Another option would be for the system 200 to stop checking additional windows at this point if the system 200 found that the just-checked window should be excluded. In those instances, the resulting alert might include only the window in focus (or a screenshot that includes whatever approved (i.e., non-excluded) windows have been identified to date for that user activity).

If the system 200 (at 438) determines that there are no more windows to check (e.g., all of the windows from the screen of the user endpoint device already have been checked), then the system 200 proceeds to establish or create an image (either full or redacted) at 444. There are a variety of ways that this step 444 may be performed.

For example, in some implementations, the endpoint agent 102a may collect a full screenshot from the user's endpoint device grabbed at the time of the triggering user activity (and one or more screenshots before and/or after the activity). In those implementations, if the system 200 (through the process 328) concludes that none of the windows from the full screenshot need to be excluded from the version that gets provided to the system administrator, then the system 200 might simply designate the full screenshot for inclusion with the alert. In that case, when the alert is created (at 434), the full screenshot is included. In this regard, the endpoint agent 214a may simply transmit the full screenshot to the data processing facility 106a for inclusion with an alert. The data processing facility may store 106a the full screenshot in its memory storage 110a. Then the server 108a utilizes the full screenshot from memory storage 110a in its alert.

Figure 5A:
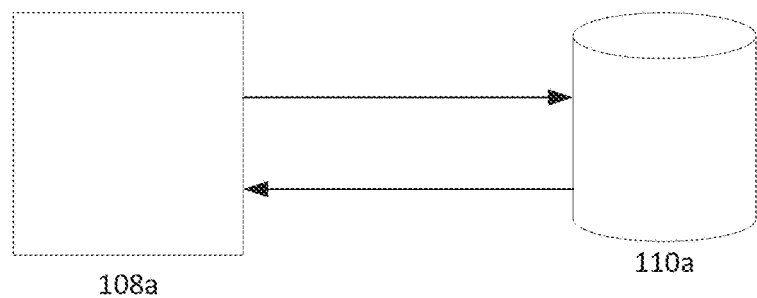
FIGS. 5A and 5B are partial schematic diagrams of the security system in FIG. 2.

This sort of approach is partially represented in the schematic representation of FIG. 5A, which shows the server 108a designating the full screenshot stored in data store 110a as the screenshot to be included in the alert. More specifically, the server 108a, according to the illustrated implementation, sends a request for the full screenshot to the data store 110a and the data store 110a returns the full screenshot for use by the server 108a in creating the alert.

If the endpoint agent (e.g., 214a) concludes that one or more of the windows need to be excluded from the image that ends up accompanying the administrator alert, then the endpoint agent 214a may send a request to the endpoint device's operating system 218a, to obtain a redacted version of the screenshot from the endpoint device's operating system 218a. In a typical implementation, the server just sends down the list of exclude parameters (e.g., apps, URLs, window titles, etc. to be excluded (or combinations thereof)) and the agent compares and decide how to take the screenshot based on this when the activity happens and before sending the activity to the server, so when the server gets the activity the screenshot has already been reduced if needed.

In those instances, the endpoint agent 214a may use an application programming interface (API) to request that the operating system 218a in the endpoint device 102a provide a screenshot that includes only some of the windows from the screen (but not the excluded screenshots). In some implementations, this may be done using OS-provided framework capability for screenshot management, for example the Core Graphics framework on MacOS. In some implementations, this may utilize Son of Grab from Apple Inc., an API to grab the contents of arbitrary sets of windows. In a typical implementation, the API is for the current information on screen; this is one reason why the exclude list may be downloaded to the endpoint agent beforehand and compared to it on runtime when the activity happens.

Figure 5B:
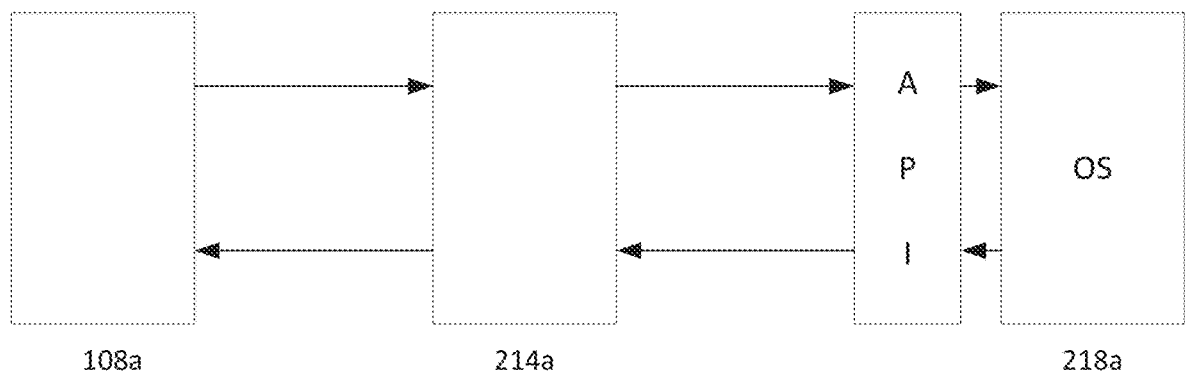

In this regard, the endpoint agent 102a can identify the desired windows (i.e., those that are ok to be included, or not excluded, in the administrator alert) explicitly. In response, the operating system provides the desired screenshot, redacted so that it includes only the desired windows and not any of the excluded windows. This variation is represented in the schematic representation of FIG. 5B. In the process represented in FIG. 5B, the server 108a sends the endpoint agent 214a the list of exclude parameters. The endpoint agent 214a interacts with the endpoint device's operating system 218a using an API to obtain any screenshot(s) that may be appropriate. And the endpoint agent 214a provides the screenshot(s) to the server 108a.

In some implementations, every screenshot secured by the endpoint agent 214a may be saved (e.g., in 216a or 110a) for use in connection with an alert associated with the related user activity or for use in connection with an alert associated with a later or earlier user activity.

Alternatively, if the endpoint agent 214a collected a full screenshot and the then concludes that some of the windows from the full screenshot need to be excluded from the administrator alert, then the endpoint agent or the remote server 108a may utilize metadata about the screenshot to create covers (e.g., fake windows or darkened shapes) to cover the visible portions of any excluded windows. In this regard, the metadata used to create the cover(s) may include information about the rectangular open, visible window(s) including positions so that the system 200 knows what area(s) to darken or cover. This information is used by the server 108a to determine how to size and shape and where on the screen to place the covers. The server 108a then produces an edited (redacted) version of the original full screenshot with covers over the excluded windows, as shown in FIG. 6B, for example.

There may be many other ways to establish or create the image for inclusion with the alert. For example, by detecting an excluded window in the screen and then show just the in-focus window with no background whatsoever (so, against an empty background, for example).

Then (at 434), the system 200 creates the alert. There are many ways that this step may be performed. In a typical implementation, the system adds image data, if any, created at 444 to a textual communication indicating that a potential threat has been identified. Other details (e.g., details from the telemetry data) may be provided with or made accessible from the alert communication.

The alert is delivered in a manner that the administrator can receive at workstation 113 and/or any other devices the administrator may have or use to access job-related communications.

Figure 7:
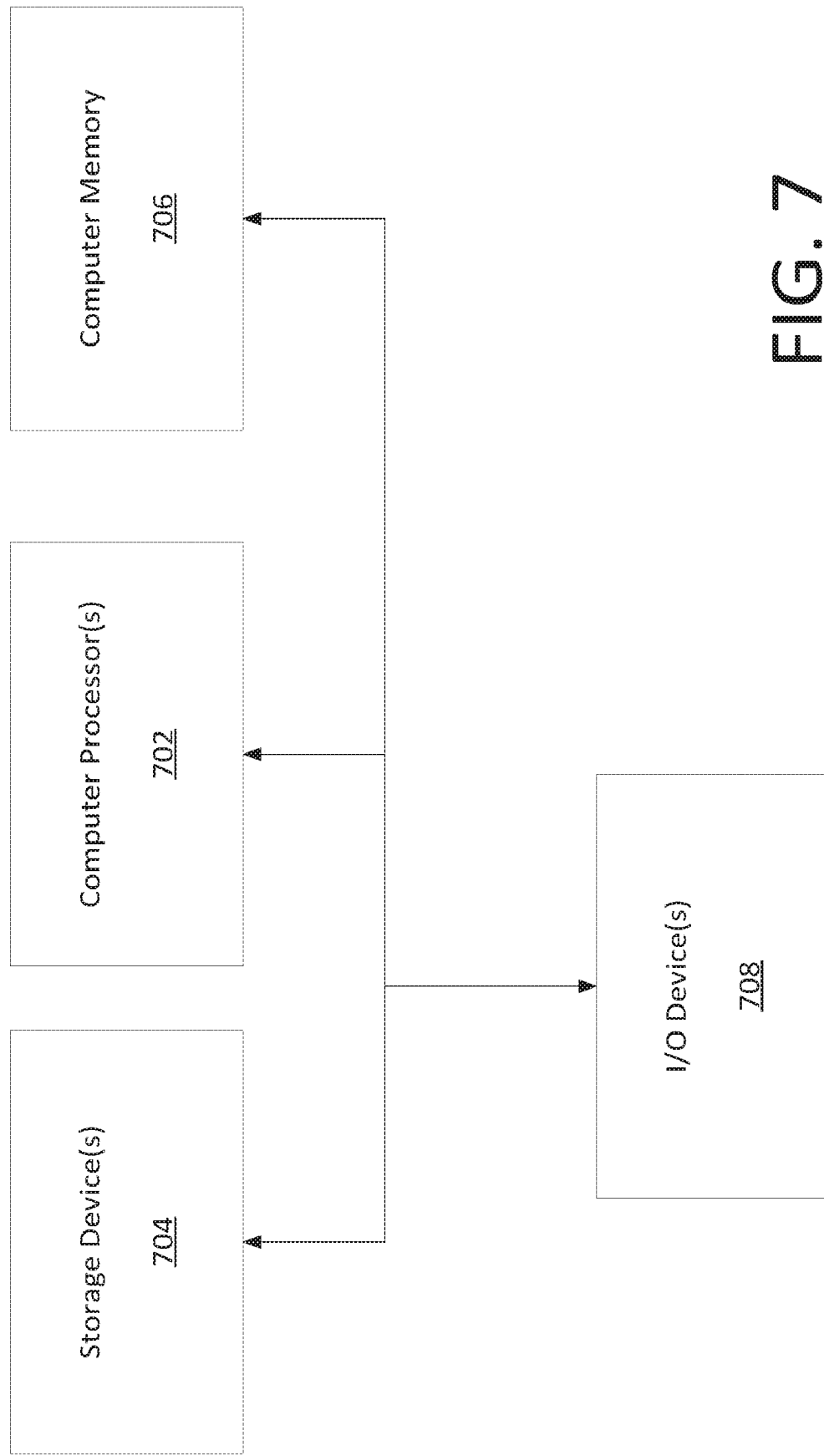
FIG. 7 is a schematic representation of an exemplary endpoint device in the computer network of FIG. 1.

FIG. 7 is a schematic representation of an exemplary endpoint device (e.g., 102a in system 100).

The illustrated endpoint device 102a in FIG. 7 has a computer-based processor 702, a computer-based storage device 704, and a computer-based memory 706. The computer-based memory 706 hosts the operating system 218a and software that, when executed by the processor 702, causes the processor 702 to perform, support and/or facilitate functionalities disclosed herein that are attributable to the processor 702 and/or to the endpoint device 102a or its agent 214a. More specifically, in a typical implementation, the computer-based memory 706 stores instructions that, when executed by the processor 702, causes the processor 702 to perform the functionalities associated with the endpoint device and its agent that are disclosed herein as well as any related and/or supporting functionalities. The endpoint device 102a has one or more input/output (I/O) devices 708 (e.g., to interact with and receive input from the external environment, e.g., a user or administrator). In a typical implementation, the data processing facilities may include similar computer components as shown in FIG. 7.

Several embodiments of the invention have been described. Nevertheless, it will be understood that various modifications may be made without departing from the spirit and scope of the invention.

For example, this disclosure describes techniques for determining whether a particular window should be excluded from a screenshot delivered with an alert or is for an application of interest (AOI) that should not be so excluded. There are a variety of ways in which this AOI (or exclusion) classification can be conducted. And, in various implementations, the system may use any one or more of several different methods to classify a recorded application window, be it a desktop application or a web-browser with an opened website. Such classification methods can include URL filtering and/or using classification engines (using known URL databases), whitelisting or blacklisting application names, using filtering engines based on OCR (Optical Character Recognition), or other onscreen data parsing that allow the detection of sensitive data such as credit card numbers, personal email, medical records etc. and the associated sensitive data detection software.

In various implementations, the processing that leads to one or more windows being excluded from a particular screenshot can take place at the endpoint agent or at the server side-uniquely or on top of the endpoint exclusion, based on capabilities that might be available only at the server, for example, image recognition, recognizing regular expressions on text extracted by OCR (e.g., security number) and/or excluding (blacking out) only part of a window.

Moreover, the system typically records user's activity without any user intervention other than the standard activity the user is intended to do (browser, open applications, fill-in data). Typically, the system will automatically grab the focused window using graphic image capturing methods such as the OS APIs, perform and process filtering mechanisms to define if the current focused application or website is excluded and thereby determine its classification. In some implementations, the defining may be done by using OS API's. The user may log in to the desktop either directly or using remote desktop. The system may build and maintain a map (e.g., utilizing an internal way that the OS orders the windows to create a full visible screen at a particular screen) of all open windows at the desktop top level (top level as of the user is viewing the screen, all layers are flattened into one desktop image) while determining its privacy level (or classification) as mentioned above. In some implementations, the graphical desktop is constructed of layers, the lowest level is the desktop background, title bar and task bar. On top of that level each window is layered on top (this is the z-axis and the order of the windows is called z-order). Windows that are being closed or hidden will be reflected in the map by removing or flagging as hidden respectfully. Newly opened window typically receive the top level, and when the user picks an already opened window (that was in the background) that window is moved from its previous order to the top of the stack, simulating the exact operation that the OS's stacking window manager is performing.

Additionally, in some implementations, reconstructing the desktop (or creating the image that will be sent with the alert) may be done by layering the different windows on top of the desktop according to their Z-order appearance while avoiding windows that have been flagged as private (or to be excluded). In some implementations, that can be done by sending each window with its boundaries and stacking level so the server, for example, can reconstruct the picture and blacken the excluded windows. This is an alternative to the agent doing the work on the origin selecting the specific windows. In some implementations, the desktop is reconstructed without the excluded windows. Moreover, in some implementations, reconstructing the window can include darkening or covering any excluded windows.

In some implementations, the reconstruction may be rendered by virtually rebuilding the desktop from the bottom layer (z-order zero) to the top, by running through a map (a collection of data about the windows, their locations, etc.) and placing each image on top of the other. If a window is classified as private (or excluded), then the renderer may either ignore that window or create a fake window with the same title, dimensions, etc. of the original window, but the fake window would hide any of the internal content.

In some implementations, the system maintains (e.g., in computer-based memory) a windows map object that contains not just the location and dimensions of images, but their privacy classification as well as other metadata (such as: window title, application name, etc.). In some implementations, the map includes the window information so that the system 200 can reconstruct the full picture from the specific images putting them one on top of the other. In some implementations, the system may gather usage statistics where each window that is being used will have a counter that counts (e.g., each time it is used). This typically may give more information on the windows in the screen so the administrator can know more, since the agent captures the activities and tracks the windows it also can count for each window ID how many activities that window has had. The counter may help the renderer to establish a caching mechanism based on rarely accessed windows, all the windows with a counter lower than a certain counter (generation counter) may, in those instances, be blended together into single layer, where future renderings start on top of that layer instead of starting from layer zero. This can be an optimization to get the final picture faster by using ready parts of the picture in cache and not calculating everything from scratch each time. Of course, an option is to let the OS do the basic work rather than doing the basic work at the endpoint agent or otherwise in the system 200 because of the extra load but if the system 200 does then it is desirable to be efficient because there could be quite an amount of windows in the picture, it should allow to take into account that among the many pictures just one window may change and all the rest may be reused in this case.

If, in those instances, a window with a counter lower than the generation counter is being accessed and gaining focus, the next rendering may start from layer zero (no cache) and may set a new generation counter for the next layer on top of the one that was now access and placed on top. If, in those instances, the delta between the current counter and the generation counter is too low (e.g., below a certain threshold), then the cache may be erased until such delta is regained and the renderer will create a new cached layer.

One example of a security system that collects telemetry data from endpoint devices for purposes of assessing threat risk is the ObserveIT Insider Threat Management (ITM) solution, available from Proofpoint. Inc. The systems and techniques disclosed herein can readily be integrated into such a security system. However, the systems and techniques disclosed herein can be integrated into and used in a wide variety of other types of systems as well.

The process set forth in FIG. 4, for example, checks whether the various windows should be excluded. The process, of course, could instead check whether the various windows should be included.

The process set forth in FIG. 4, for example, shows that in classifying the widows of a screenshot as either includable or excludable in an alert to the administrator, if the system concludes that the in-focus window should be excluded from any administrator alert, the system does not check if any of the other open windows should be excluded. Instead, the system creates the alert without any image data, i.e., without a screenshot from the user's endpoint device. In some implementations, however, the system, upon concluding that the in-focus should be excluded, could nevertheless proceed to check any other open windows to determine whether they might be included in an alert to the administrator or not. In those implementations, the system might create a version of the screenshot for the alert with the in-focus window (and any other windows deemed to be excludable) omitted or covered-up, but all other screenshot data included.

Any processor(s), or the like, described herein or otherwise present in the system(s) described, can be implemented as one or more than one processor. If implemented as more than one processor, the processors can be in one facility (e.g., in the building or campus of the hotel) or distributed across multiple locations. Likewise, any memory described herein, or otherwise present in the system(s) described, can be implemented as one or more than one memory device. If implemented as more than one memory device, the memory devices can be in one facility or distributed across multiple locations.

Various aspects of the subject matter disclosed herein can be implemented in digital electronic circuitry, or in computer-based software, firmware, or hardware, including the structures disclosed in this specification and/or their structural equivalents, and/or in combinations thereof. In some embodiments, the subject matter disclosed herein can be implemented in one or more computer programs, that is, one or more modules of computer program instructions, encoded on computer storage medium for execution by, or to control the operation of, one or more data processing apparatuses (e.g., processors). Alternatively, or additionally, the program instructions can be encoded on an artificially generated propagated signal, for example, a machine-generated electrical, optical, or electromagnetic signal that is generated to encode information for transmission to suitable receiver apparatus for execution by a data processing apparatus. A computer storage medium can be, or can be included within, a computer-readable storage device, a computer-readable storage substrate, a random or serial access memory array or device, or a combination thereof. While a computer storage medium should not be considered to include a propagated signal, a computer storage medium may be a source or destination of computer program instructions encoded in an artificially generated propagated signal. The computer storage medium can also be, or be included in, one or more separate physical components or media, for example, multiple CDs, computer disks, and/or other storage devices.

Certain operations described in this specification can be implemented as operations performed by a data processing apparatus (e.g., a specially programmed processor) on data stored on one or more computer-readable storage devices or received from other sources. The term "processor" (or the like) encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, for example, code that constitutes processor firmware, a protocol stack, a database management system, an operating system, a cross-platform runtime environment, a virtual machine, or a combination of one or more of them. The apparatus and execution environment can realize various computing model infrastructures, such as web services, distributed computing, and grid computing infrastructures.

While this specification contains many specific implementation details, these should not be construed as limitations on the scope of any inventions or of what may be claimed, but rather as descriptions of features specific to embodiments of inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations may be described herein as occurring in a particular order or manner, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products. Other implementations are within the scope of what is described.

In various implementations, a computer-readable medium computer-readable storage medium may include instructions that, when executed by a computer-based processor, cause that processor to perform or facilitate one or more (or all) of the processing and/or other functionalities disclosed herein. The phrase computer-readable medium or computer-readable storage medium is intended to include at least all mediums that are eligible for patent protection, including, for example, non-transitory storage, and, in some instances, to specifically exclude all mediums that are non-statutory in nature to the extent that the exclusion is necessary for a claim that includes the computer-readable (storage) medium to be valid. Some or all these computer-readable storage media can be non-transitory.

Other implementations are within the scope of the claims.

What is claimed is:

1. A computer-based method comprising:
monitoring user activities at an endpoint device on a computer network;
determining if one of the user activities at the endpoint device presents a potential threat to network security;
classifying each open window from a screen of the endpoint device, at a time of the user activity, according to whether that window is likely to contain private or confidential user information;
creating an alert of the potential threat; and
providing the alert, along with a redacted version of a screenshot from a screen of the endpoint device, wherein the redacted version of the screenshot is a version of the screenshot where each of the open windows from the screen of the endpoint device that has been classified as likely containing private or confidential user information is obscured or removed from view.

2. The computer-based method of claim 1, wherein classifying each of the open windows comprises:
comparing window parameters for each window against a list of parameters for including or excluding a window.

3. The computer-based method of claim 1, further comprising:
enabling a human administrator to view the alert with the redacted version of the screenshot.

4. The computer-based method of claim 1, wherein determining if one of the user activities presents a potential threat to network security comprises:
assessing data regarding the user activity collected by a computer-based endpoint agent deployed at the associated endpoint device.

5. The computer-based method of claim 1, wherein providing the redacted version of the screenshot comprises:
receiving data that describes physical characteristics of the open windows from an operating system of the endpoint device;
receiving a full screenshot of the screen of the endpoint device; and
obscuring visible portions of the one or more open windows by creating visual covers sized and placed based on the physical characteristics.

6. The computer-based method of claim 1, wherein providing the redacted version of the screenshot comprises:
identifying which of the open windows on the screen of the endpoint device may be included with the alert; and
requesting a screenshot from an operating system of the endpoint device that only includes the windows identified as ones that may be included with the alert.

7. The computer-based method of claim 1, further comprising:
receiving, at a computer-based endpoint agent on the endpoint device, an indication of the user activity; and
collecting data about the indicated user activity from the operating system of the endpoint device with the computer-based endpoint agent,
wherein determining if one of the user activities at the endpoint device presents a potential threat to network security comprises assessing the collected data.

8. The computer-based method of claim 1, further comprising:
making the alert, with the redacted version of the screenshot, available in electronic form to a human administrator.

9. The computer-based method of claim 1, further comprising:
providing, with the alert, a redacted version of one or more other screenshots from the endpoint device, wherein the one or more other redacted screenshots show a redacted version of the screen of the endpoint device during one or more other user activities before and/or after the alert-related user activity.

10. A computer system comprising:
a plurality of endpoint devices coupled to a communications network,
wherein each endpoint device comprises:
a computer-based processor; and
a computer-based memory that stores computer-readable instructions that, when executed by the processor, cause the processor to act as a computer-based endpoint agent for the associated endpoint device,
wherein each computer-based endpoint agent is configured to monitor user activities at the associated endpoint device, and
wherein the computer system is configured to:
identify if any of the monitored user activities presents a potential threat to network security;
classify each open window from a screen of the endpoint device, at a time of the user activity, according to whether that window is likely to contain private or confidential user information;
create an alert of any such potential threats; and
provide the alert, along with a redacted version of a screenshot from a screen of an associated one of the endpoint devices, wherein the redacted version of the screenshot is a version of the screenshot where each of the open windows from the screen of the associated endpoint device that has been classified as likely to contain private or confidential information is obscured or removed from view.

11. The computer system of claim 10, wherein the classifying one or more of the open windows comprises comparing window parameters for each window against a list of parameters for including or excluding a window.

12. The computer system of claim 10, wherein the system is further configured to:
enable a human administrator to view the alert with the redacted version of the screenshot.

13. The computer system of claim 10, wherein identifying if any of the user activities presents a potential threat to network security comprises:
assessing data regarding the user activity collected by a computer-based endpoint agent deployed at the associated endpoint device.

14. The computer system of claim 10, wherein providing the redacted version of the screenshot comprises:
receiving data that describes physical characteristics of the open windows from an operating system of the endpoint device;
receiving a full screenshot of the screen of the endpoint device; and
obscuring visible portions of the one or more open windows by creating visual covers sized and placed based on the physical characteristics.

15. The computer system of claim 10, wherein providing the redacted version of the screenshot comprises:
identifying which of the open windows on the screen of the endpoint device may be included with the alert; and
requesting a screenshot from an operating system of the endpoint device that only includes the windows identified as ones that may be included with the alert.

16. The computer system of claim 10, wherein the endpoint agent at each of the endpoint devices is configured to:
receive an indication of the user activity; and
collect data about the indicated user activity from the operating system of the endpoint device with the computer-based endpoint agent, and
wherein identifying if any of the user activities at the endpoint device presents a potential threat to network security comprises assessing the collected data.

17. The computer system of claim 10, further configured to make the alert, with the redacted version of the screenshot, available to one or more human administrators via the communications network.

18. The computer system of claim 17, further comprising: providing, with the alert, a redacted version of one or more other screenshots from the endpoint device, wherein the one or more other redacted screenshots show a redacted version of the screen of the endpoint device during one or more other user activities before and/or after the alert-related user activity.

\* \* \* \* \*